March 2, 1948.                     G. A. WALDIE                     2,437,140
                       ELECTRONIC MOTOR CONTROL CIRCUITS
                         Filed Oct. 20, 1943         2 Sheets-Sheet 1

INVENTOR
GEORGE A. WALDIE,
BY
Toulmin & Toulmin
ATTORNEYS

March 2, 1948.  G. A. WALDIE  2,437,140
ELECTRONIC MOTOR CONTROL CIRCUITS
Filed Oct. 20, 1943  2 Sheets-Sheet 2
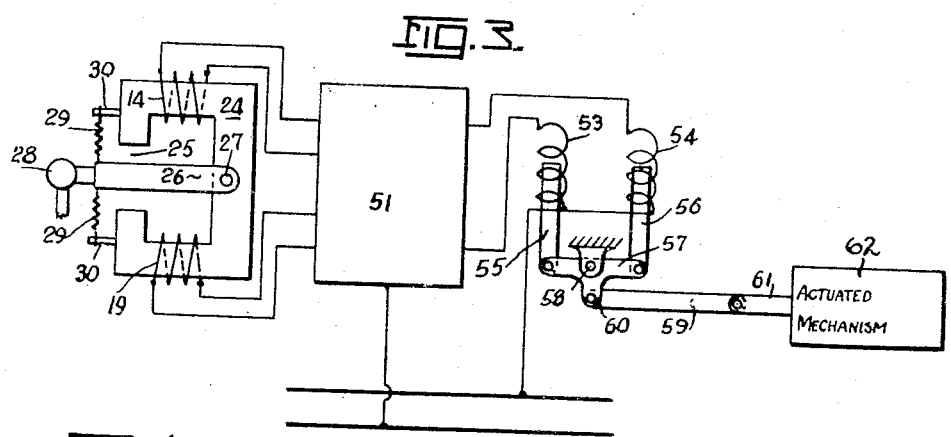
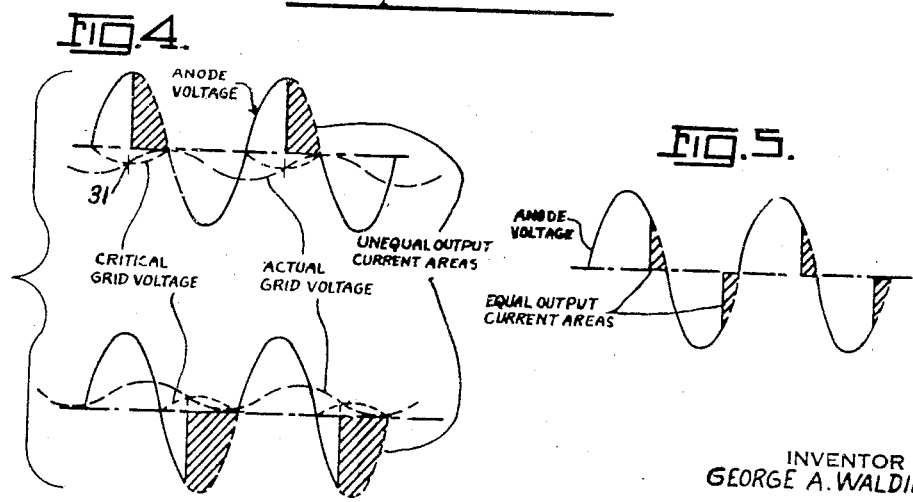
INVENTOR
GEORGE A. WALDIE
BY
Toulmin & Toulmin
ATTORNEYS Patented Mar. 2, 1948

2,437,140

UNITED STATES PATENT OFFICE 2,437,140

ELECTRONIC MOTOR CONTROL CIRCUITS

George A. Waldie, Edison, Ohio, assignor to H-P-M Development Corporation, a corporation of Delaware Application October 20, 1943, Serial No. 506,983

1 Claim. (Cl. 318—257)

The present invention relates to the control of mechanical operation, particularly by the use of electronic devices as applied to direct current loads such as motors, relays, etc.

Various schemes have been advanced to control the speed of direct current motors from a remote position, and in general, most of them depend on the use of a variable resistor connected either in the field or in the armature circuit. Rheostats of this general character entail considerable losses when dealing with large power since they operate on the energy dissipative principle and in addition, their effectiveness of control is affected by a number of variables such as changes in room temperature, humidity and the presence of dust, etc. There is also present the danger from electric shock when operating the rheostat because the adjustable arm on the resistor is directly associated with the line and electrical leakage due to poor insulation of the parts may be involved.

Many forms of mechanical operation require a sudden reversal of rotation of the motor as well as changes in speed, in which case, a reversing device such as a switch is usually provided in addition to the variable resistor to effect reversal and speed control in the opposite direction. The difficulty of arcing and resulting burned contacts may be encountered at the switch, particularly when large currents are being carried.

There is therefore a specific need in the art of electrical control systems for an improved structure and/or system by which the current supplied to a direct current load may be accurately controlled as to magnitude and direction without the breaking of contacts and without the necessity for auxiliary switches or other devices which are connected directly to the energy supply mains.

The primary object of the invention is to provide an efficient control system for an electric load and in which the current passing through the load may be limited to a predetermined amount and to a predetermined direction without having any direct connection between the control element and the current supply for the load.

Another object is to provide a combined control and supply system for a direct current load of the character set forth which would have the advantage of being self-rectifying so that the load may be energized from an alternating current source.

Still another object is to provide a direction control for motors in which the control element or elements are not electrically connected to the high voltage lines so as to eliminate all danger of shock.

A still further object is to provide a highly sensitive but stable speed and direction control of direct current motors in which the exercised control is so sensitive that individual movements of the control element produce accurately proportional movements of the motor.

Another object is to provide an efficient and a sensitive control for direct current motors which permits reversal of the motor at the control element without the breaking of current carrying circuits and offers the same degree of sensitivity of speed control in either direction of rotation.

A more general object is to provide a control for a direct current load such as a motor or relay which is so sensitive that only an infinitesimally small movement of the control element is necessary to find adequate response in the operation of the motor or relay and a correspondingly small movement of the control element is necessary to reverse the operation of the motor or relay and to control the speed of operation in the reverse direction.

These objects are attained in brief by employing a plurality of electron discharge devices of the gaseous type and controlling the sequence of firing of the devices with respect to one another by means of a magnetic element having a control member which is completely disconnected from the electric system, but the movement of which is so related to the control element of the electric circuits as to change the electrical conditions within the electron discharge devices sufficient to control the currents passing therethrough. These devices are preferably connected in opposition in the case of a reversible motor but may be connected in the same direction in case separate loads are employed with the individual devices.

The invention will be better understood when reference is made to the following description and the accompanying drawings in which:

Figure 3 illustrates still another adaptation of the improved circuit and structure.

Figures 4 and 5 represent diagrams which indicate the voltage and current conditions within at least one of the improved circuits and associated structure.

Figure 1:
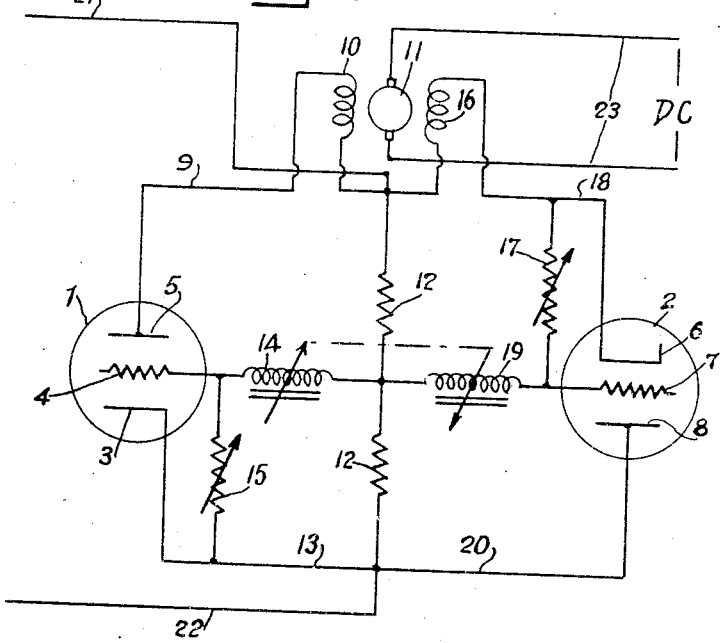
Figure 1 represents a schematic view of an improved electrical circuit and structure employing some of the principles of the present invention.

Referring more particularly to Figure 1, a pair of gaseous discharge devices 1 and 2, either of the glow discharge or arc discharge type, depending on the current requirements of the load may be employed. The device 1 includes a cathode 3 which may be directly or indirectly heated, an electrostatic control element or grid 4 and an anode 5, while the device 2 includes a cathode 6, a grid element 7 and an anode 8. The anode 5 may be connected through a conductor 9 to a field winding 10 of a direct current motor 11, the circuit being completed through a pair of fixed resistors 12 and a conductor 13 back to the cathode 3.

The input circuit of the device 1 includes a variable reactor 14 connected between the grid 4 and a position between the resistors 12. A variable resistor 15 may also be connected between the grid element and the conductor 13.

The device 2 has corresponding elements and functions as those described in connection with device 1 except that it is connected to the field winding load circuit 16 in the reverse manner from the other device. A variable resistor 17 is connected between the grid element 7 and the conductor 18 which passes to the cathode 6 and there is a variable reactor 19 connected to the lower connection of the lower resistor 12 through conductor 20. While I have shown the field coils 10 and 16 of the motor 11 as constituting separate elements, it will be understood that if desired, a single field winding may be provided for the motor as long as the tap is taken from the midpoint of the winding through the upper bridge resistor 12 to the inner terminals of the reactors 14, 19.

A supply of alternating current is taken to the devices 1, 2 through mains 21, 22, one of which is connected to the mid-tap between the fields 10 and 16 and the other is connected to conductors 13 and 20. The armature circuit of the motor 11 may be energized with direct current through a supply circuit 23.

It will be noted in the drawing that the arrows drawn across the reactors 14 and 19 point in opposite directions and are connected together. This is to signify that the reactances of these reactors are adjustable in a differential manner. Thus, as one of the reactances is increased in value the other reactance is decreased proportionately or in the same degree. Any suitable structure may be provided in order to obtain this differential change in the reactors 14, 19 and one such structure has been illustrated in connection with Figure 3. The coils of the reactors 14, 19 are wound on a common magnetic core 24 having a C shape, i. e. one of the legs includes an air gap 25. A magnetic armature 26 is pivoted at 27 to the other leg of the core, this armature terminating in a knob 28 adapted to be operated either manually or magnetically.

A pair of oppositely disposed springs 29 maintain the armature in an approximate midway position between a pair of supports 30, the arrangement being such that when the knob is moved upwardly, the lower spring 29 is placed under tension and the upper spring is relieved partly of its tension so that when the hand is removed from the knob the armature will assume a midway position within the air gap 25. It will be understood that this air gap would in practice be of considerably less length than that illustrated in Figure 3 in order that the permeability of the core as a whole will be sufficiently large to provide the proper reactance effects at the coils. It is apparent that as the armature 26 is moved upwardly the effective air gap in the upper portion of the core 24 is decreased, thus increasing the reactance of the coil 14 while the effective air gap of the lower portion of the core is increased to decrease the reactance of the coil 19. By thus simply swinging the armature 26 upwardly, the reactance of coil 14 is increased and the reactance of coil 19 is decreased in a corresponding manner.

Referring now to Figure 1, it is apparent that alternating voltage is applied both to the output circuit which comprises the cathode 3 and the anode 5 and also to the input circuit which includes the electrodes 3 and 4. The phase relationship between the grid voltage and the anode voltage can obviously be changed by varying the reactance 14 and the same thing applies to the voltage relationships in the tube 2 when the reactance 19 is correspondingly varied. The net result is that by varying the reactance 14 in one direction and the reactance 19 in the opposite direction, the phase relationships of the voltages applied to the electrostatic control elements 4 and 7 are shifted with regard to the anode voltages applied to the respective tubes 1 and 2. This can be readily seen by examination of the diagrams shown in Figure 4 if it is assumed that the tubes 1 and 2 are of the arc or glow type and each have a critical negative grid voltage characteristic as shown in the figure which prevents the device from starting unless this critical voltage is exceeded. Assume that the adjustment made on the reactor 14 is such that the actual voltage applied to the grid 4 intercepts the critical grid voltage at point 31 (Figure 4), the tube will fire and the resulting glow or arc discharge will pass through the tube throughout the remainder of the positive half cycle of the anode voltage. The firing period of the tube is indicated by the shaded area in each half cycle of the anode voltage.

Now let us assume that the reactance 14 is increased, for example by raising the armature 26 (Figure 3) upwardly. The effective voltage applied to the grid will shift phase-wise so that the actual grid voltage curve will cut the critical grid voltage curve at a later period and the aggregate amount of current passing through the tube 1 will decrease. It is apparent that by varying the reactance 14 over a sufficiently wide range the tube 1 can be triggered at any point in the positive half cycle of the anode voltage and thereby change the average amount of current flowing over a predetermined period of time through the field winding load 10.

The tube 2 operates in the same manner as tube 1 except that it is reversely connected and when the reactance 19 is decreased in an amount corresponding with the increase of reactance 14, the alternating voltage applied to the grid 7 is shifted phase-wise, but in the opposite direction to trigger the tube 2 earlier in each half cycle of the anode voltage as shown in the lower portion of Figure 4. Under these circumstances the current flowing through the field winding load 16 is increased. It will be understood that rectified current flowing through coil 10 tends to move the armature 11 in one direction and rectified current of opposite direction and flowing through the field winding 16 tends to cause the motor to rotate in the reverse direction. Thus, by differentially altering the reactances 14, 19 by means of a swingable armature 26 (Figure 3) or in any other suitable manner the motor 11 can be caused to rotate in one or the other direction depending on the relative magnitudes of the reactances 14, 19.

Should the armature 26 remain in a position midway of the ends of the air gaps 25 so in effect to provide two air gaps of equal length within the upper and lower portions of the core 24, the phase relationships between the grid and anode voltages of the two tubes may be such as to permit as much current to flow through field coil 10 in one direction as flows through the field coil 16 in the opposite direction so that the motor does not rotate. This condition is shown in Figure 5 in which the output current areas of the upper and lower half cycles are exactly equal. Notwithstanding the fact that the motor does not rotate in either direction and is therefore stationary, it remains in a sensitive condition ready instantly to rotate in either direction upon the slightest change being made in the magnitudes of the reactances 14, 19. This highly sensitive but motionless condition of the motor is useful when an instantaneous response of the motor in either direction is required.

The resistances 15, 17 are provided to adjust the sensitivity of the circuit and it is apparent that due to the high state of balance that is possible in the bridge form of circuit shown in Figure 1 extreme orders of sensitivity can be obtained so that even the slightest change in the reactors 14, 19 is sufficient to bring instant response in the operation of the motor 11, either by way of change in speed or change in direction of rotation or both. Any speed of the motor may be obtained in this manner from the highest practical speed down to the slowest speed because any degree of voltage phase shift in the tubes 1 and 2 may be obtained and the instantaneous speed of the motor is directly proportional to the instantaneous changes in the voltage phase shifts.

In Figure 3, the load is constituted of a pair of coils 53, 54 which form part of a magnetic system. Movable cores 55, 56 respectively are adapted to slide within solenoids 53, 54. These cores may be pivotally mounted at their lower ends to a double bell crank lever 57 pivoted at 58. A connecting rod 59 is swivelly secured at 60 to the lever 57 and at the opposite end is pivotally connected to the control rod 61 of a reciprocatory actuated mechanism 62 of any suitable character. Rectangle 51 represents the tubes 1 and 2 of Figure 1 and the directly associated circuits except the reactors 14, 19 and the motor structure. As the lever 26 is moved upwardly, the upper portion of the air gap 25 is decreased and the lower portion is increased to vary the reactances 14, 19 in such a way as to shift the phase of the grid voltages applied to the tubes 1 and 2. Thus the current in one of the coils 53, 54 may increase and the current in the other of the coils decrease to cause the lever 57 to swing about its pivot 58. By simply manipulating the lever 26, the movement of the rod 61, both as to speed and direction can be accurately controlled due to the predetermined amounts of current that are available in the aggregate at the tubes 1 and 2. The thrust or pulling effect exercised on the rod 59 may be exceedingly large.

Figure 2:
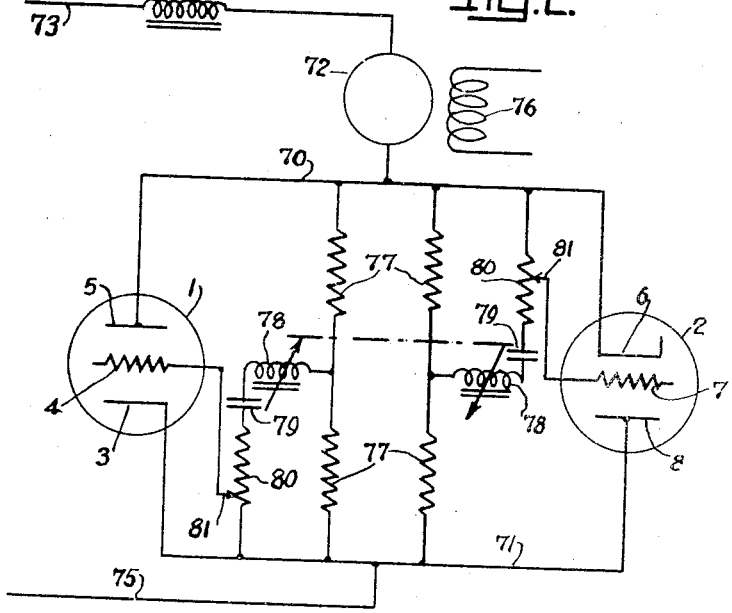
Figure 2 is a modified form of the structure and system shown in Figure 1.

Figure 2 shows a modified form of the tube circuit and as in the case of Figure 1 employs a pair of arc discharge rectifiers each containing a cathode, an anode and an electrostatic control element. The output circuits of the devices 1 and 2 are reversely connected through the conductors 70, 71 and the armature circuit of a motor 72 may be connected to conductor 70 or if desired to conductor 71. One side of electric mains 13 may be connected through an iron core choke coil 74 to the other side of the motor armature. The other side 75 of the electric mains may be connected to the conductor 71. A separately excited direct current field 76 may be provided for the motor.

Two pairs of resistors, each constituting separate elements 77, may be connected in parallel across the conductors 70, 71 and a variable reactor connected between the mid-point of each pair of resistors and the respective conductors 70, 71 passing through a condenser 79 and a fixed resistor 80. A variable tap 81 may be taken from the resistor 80 to the respective grids 4, 7 of the tubes 1 and 2.

The variable reactor 78 may comprise coils wound on a common core similar to that described in connection with Figure 3 in which the permeability of the core as a whole is varied, for example, by means of a lever or armature 26 and thus change the phase relationship of the grid voltage of each tube with respect to its anode voltage. The fact that the reactance of one reactor is varied in a differential manner with respect to the reactance of the other reactor has been indicated by the arrows passing through the reactors in opposite directions and connected by a dot-dash line. When the tube 1 is triggered at a predetermined point in the anode voltage positive half cycle and the tube 2 is triggered at a different predetermined point in the negative half cycle, the difference in magnitude of the positive and negative half waves of the current is transmitted to the armature 72 of the motor, causing the motor to rotate in a direction depending on which of the positive or negative voltages is predominant. In other words, the current passing through tube 1 tends to rotate the armature in one direction and the current passing through tube 2 tends to rotate the armature in the opposite direction. However, when these currents are equal as when the tubes are fired at the same point in their respective half-wave impulses the armature will be stationary but will also be sensitively poised to rotate in either direction depending on any change in the phase relationships of the voltages applied to the grids 4 and 7. The sensitivity of the circuit as a whole is controlled by the position of the taps 81 on their respective resistors 80 which assist in determining the maximum swings of voltage applied to the control elements 4 and 7. The condenser 79 may be employed to increase the stability of the circuit, thus preventing any hunting effects at the motor 72 although if desired, the condensers may be omitted.

Figure 2 offers the advantage over the system shown in Figure 1 in that the control exercised at the reactors 78 affects the armature of the motor rather than the field and finds its greatest usefulness in small control applications which necessitate a relatively small control or correcting motor. It will be understood that the choke coil 74 may also be omitted if desired, the purpose of this choke being to eliminate harmonic frequencies or other parasitic impulses which tend to pass through the conductors 73, and also serves to smooth out each rectified half cycle wave of current.

From the foregoing, it is evident that I have disclosed a highly sensitive and efficient control system, making use of gaseous discharge devices, both of the controllable and uncontrollable type, and the differential or the cumulative current through the devices may be advantageously employed to operate a direct current load which in turn may constitute a control element of a mechanical, electrical or hydraulic system. The differential or cumulative currents passing through the system are sensitively and efficiently controlled by means of one or more reactors which may be operated simultaneously and either differentially or cumulatively to vary the reactances within the circuits and thus control the currents in the load.

While I have disclosed my invention in connection with the employment of variable reactors of the inductance type, it is obvious that I may utilize reactances of the capacitative type or even impedances (including resistance) in which the respective values of the impedances in the tube circuits are differentially or cumulatively controlled in order to provide a phase shift between the grid and the anode voltages. It will also be apparent to those skilled in the art that instead of employing arc discharge devices for translating and controlling currents within the circuits I may if desired, and depending on the character of the load, utilize glow discharge devices.

It will be understood that I desire to comprehend within my invention such modifications as come within the scope of the claim and the invention.

Having thus fully described my invention, what I claim as new and desire to secure by Letters Patent, is:

In combination in an electrical control circuit for varying the rate and direction of rotation of a direct current motor, a field winding, a direct current source for exciting said field winding, and an armature associated with said field winding, the combination of a first and second triode each having a cathode, an anode, and a grid, an alternating current supply including first and second leads, means connecting one side of said armature to said first lead and the other side of said armature to the anode of said first triode and the cathode of said second triode, means connecting said second lead to the cathode of said first triode and the anode of said second triode, two pairs of serially connected fixed resistors connected in parallel across said leads, a first variable resistor having one end connected to said first lead and its other end connected through a condenser and a first variable reactor to an intermediate point between the resistors of one pair of said fixed resistors, an adjustable tap on said first variable resistor connected to the grid of said second triode, a second variable resistor having one end connected to said second lead and its other end connected through a condenser and a second variable reactor to an intermediate point between the resistors of the other pair of fixed resistors, an adjustable tap on said second variable resistor connected to the grid of said first triode, and means for simultaneously differentially actuating said variable reactors.

GEORGE A. WALDIE.

REFERENCES CITED

The following references are of record in the file of this patent:

UNITED STATES PATENTS

| Number | Name | Date |
| --- | --- | --- |
| 1,376,452 | Meyer | May 3, 1921 |
| 1,593,659 | Standerwich | July 27, 1926 |
| 1,920,803 | Nagashev | Aug. 1, 1933 |
| 1,944,756 | Quarles | Jan. 23, 1934 |
| 2,027,140 | Alexanderson | Jan. 7, 1936 |
| 2,081,780 | Troger | May 25, 1937 |
| 2,116,593 | Bouvier et al. | May 10, 1938 |
| 2,150,265 | Conover | Mar. 14, 1939 |
| 2,175,009 | Anderson | Oct. 3, 1939 |
| 2,264,333 | Satterlee | Dec. 2, 1941 |
| 2,276,752 | Willis | Mar. 17, 1942 |
| 2,288,295 | Moyer | June 30, 1942 |
| 2,288,339 | Willis | June 30, 1942 |
| 2,312,117 | Moyer | Feb. 23, 1943 |
| 2,330,429 | Hull | Sept. 28, 1943 |